United States Patent
Eyer et al.

(10) Patent No.: US 6,401,242 B1
(45) Date of Patent: Jun. 4, 2002

(54) METHOD AND APPARATUS FOR DESIGNATING A PREFERRED SOURCE TO AVOID DUPLICATIVE PROGRAMMING SERVICES

(75) Inventors: Mark K. Eyer; Zicheng Guo, both of San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/599,293

(22) Filed: Jun. 22, 2000

Related U.S. Application Data

(62) Division of application No. 08/990,641, filed on Dec. 15, 1997.

(51) Int. Cl.[7] .......................... H04N 7/10; H04N 7/173
(52) U.S. Cl. .......................... 725/35; 725/36; 725/63; 725/98; 725/118; 725/127
(58) Field of Search .............................. 725/39, 98, 35, 725/36, 63, 118, 127

(56) References Cited

U.S. PATENT DOCUMENTS

| | | |
|---|---|---|
| 5,296,932 A | 3/1994 | Long |
| 5,550,576 A | 8/1996 | Klosterman |
| 5,559,548 A | 9/1996 | Davis et al. |
| 5,559,550 A | 9/1996 | Mankovitz |
| 5,576,755 A | 11/1996 | Davis et al. |
| 5,619,274 A | 4/1997 | Roop et al. |
| 5,635,989 A | 6/1997 | Rothmuller |
| 5,684,525 A | 11/1997 | Klosterman |
| 5,760,821 A | 6/1998 | Ellis et al. |
| 5,790,198 A | 8/1998 | Roop et al. |
| 5,805,230 A | 9/1998 | Staron |
| 5,808,694 A | 9/1998 | Usui et al. |
| 5,812,205 A | 9/1998 | Milnes et al. |
| 5,828,945 A | 10/1998 | Klosterman |
| 5,923,362 A | 7/1999 | Klosterman |
| 6,072,983 A | 6/2000 | Klosterman |

FOREIGN PATENT DOCUMENTS

WO   WO 96/33572   10/1996

OTHER PUBLICATIONS

Cherrick, Sol. et al., An Individually Addressable TV Receiver With Interactive Channel Guide Display, VCR, and Cable Box Control, IEEE Transactions on Consumer Electronics, vol. 40, No. 3, Aug. 1994, pp. 317–328.

*Primary Examiner*—Andrew Faile
*Assistant Examiner*—Kieu-Oanh Bui
(74) *Attorney, Agent, or Firm*—Barry R. Lipsitz; Douglas M. McAllister

(57) ABSTRACT

Interactive Program Guide (IPG) data for television is delivered to integrated receiver-decoders (IRDs) in a decoder population via, for example, a satellite network. The IPG data provides scheduling information for global and local programming services which are carried via the satellite network as well as another network such as a CATV network or a terrestrial broadcast network. Each IRD is assigned to an IPG region using unit addressing. At the IRD, IPG data is filtered so that only the global data and the region-specific data for the IRD's IPG region is retained and processed by the IRD. Channel map data is also delivered to the IRDs so that bundles of IRD data can be filtered out using firmware filtering to discard program sources that are not present in the channel map. The IRD data which is retained after filtering is used to provide scheduling information via an on-screen display. A preferred source may be designated when there are duplicative channels on the different networks.

6 Claims, 4 Drawing Sheets

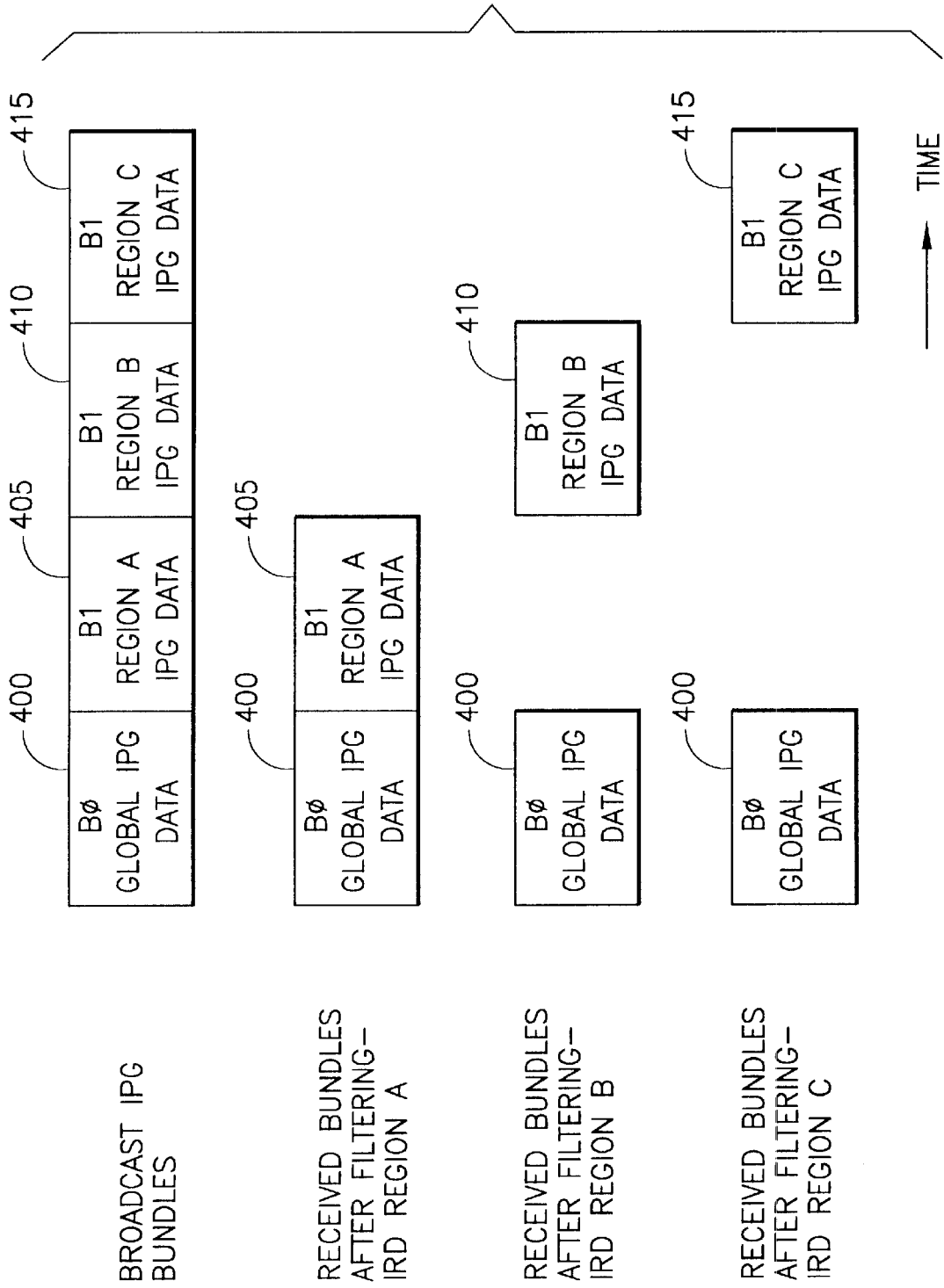

METHOD AND APPARATUS FOR DESIGNATING A PREFERRED SOURCE TO AVOID DUPLICATIVE PROGRAMMING SERVICES

This is a divisional application of U.S. patent application Ser. No. 08/990,641 filed on Dec. 15, 1997.

BACKGROUND OF THE INVENTION

This application claims the benefit of U.S. Provisional Application No. 60/063,085, filed Oct. 24, 1997. The present invention relates to an apparatus for providing interactive program guide (IPG) data for television. In particular, IPG data is provided in a satellite data stream for television decoders which receive both satellite transmissions and local cable television (CATV) transmissions. The IPG data includes global data which describes programming offered by satellite and national cable channels, and network-specific data which describes programming provided by regional cable networks or local terrestrial broadcasters.

The invention has particular applicability to the provision of an IPG for events (e.g., television programs, movies, concerts, sporting events, interactive forums, and the like) available over a satellite or cable television network or off-air channels.

The availability of digital networks for the transmission of games, information services, television programming (including movies and special events), shop at home services, and the like, has vastly increased the number and variety of such services available to consumers. Systems with five hundred or more programming channels have been in operation. One challenge that has emerged in the development and design of such systems is how to keep consumers informed as to the scheduling of the many different events that are offered.

A logical solution to the problem of providing an accurate, up-to-date guide for a large number of events is to provide the guide via an electronic medium. Program guides can now be downloaded to a subscriber terminal, such as a "set top box" or "integrated receiver-decoder" (IRD) connected to a subscriber's television. One stumbling block in implementing such an electronic program guide is the is amount of bandwidth required to carry the large amount of scheduling information over a communication channel.

Another obstacle is the amount of memory required to store scheduling data for a week or more within the set top box. Such random access memory (RAM) is relatively expensive. This conflicts with the requirement that a consumer set top box be a relatively inexpensive item.

Another problem is the provision of the schedule information in a timely manner. Subscribers would grow impatient if the response time for providing scheduling information in answer to a query for such information for a particular time slot takes too long. In an ideal system, a subscriber would receive an immediate answer to a request for scheduling information pertaining to a particular channel and/or time period. After obtaining scheduling information, a subscriber may desire to have further details about a particular program. Again, it would be inconvenient to wait for more than a few seconds to obtain descriptive information about a program. Ideally, the information should be provided almost instantaneously after being requested.

A further problem is that television and other programming service signals may be delivered via different communication networks or plants. For example, a user may now receive television signals via a cable television network or a via a direct satellite link to the user's home. Integrated receiver decoders (IRDs) may include both a satellite tuner/demodulator as well as a CATV tuner/demodulator. Television signals which are transmitted by satellite can generally be received nationwide, for example, in the continental United States.

Thus, such signals are typically reserved for programming which is of interest to all or most recipients, and do not include programming which is only of interest to specific geographical regions. For example, satellite broadcasts may include network television programs and national news broadcasts, but will not include local news programs, local advertising or local interest "infomercial" programming (such as video "homes for sale" programs), or local access programming. Local access programming refers to programming time which CATV operators may be required to allot to educational, civic and other non-profit organizations.

Furthermore, programming may also be transmitted by terrestrial broadcast. Different users may receive different terrestrial broadcasts depending on factors such as topology and antenna size, for example. Thus, the number and identity of users who receive a specific terrestrial broadcast is not well defined. The concept of a terrestrial broadcast network can nevertheless be defined generally, if not exactly, in terms of the user's location. In contrast, the number and identity of users who can receive a cable television signal is defined by the cable plant itself, e.g., the location of the cable.

Terrestrial broadcast and CATV networks provide both global interest programming, such as network television programs and national news broadcasts, as well as local interest programs. In the United States, it is estimated that a few hundred national programming sources are available to CATV systems. These sources include satellite sources which are transmitted to CATV headends, national cable channels, and affiliated source groups or network programming, e.g., the ABC and CBS networks.

Local or regional programming sources are believed to number in the thousands, but this programming is available to only a small number of CATV systems. These sources include independent local sources, and affiliates of the major national program networks. A typical CATV channel line-up consists of a number of local sources (e.g., ten to twenty), with the remainder (e.g., fifty to sixty) being a subset of the national sources. Thus, about two thirds of the CATV channels are global interest (e.g., non-network-specific) programming, and one third are local interest (e.g., network-specific) programming.

Accordingly, there is a need for a system to provide scheduling information for both global and local programming. The system should seamlessly integrate the scheduling information for programming which is provided over two or more communication networks. The system should be compatible with IRDs having both satellite and CATV tuner/demodulators. The system should allow the IRD to filter out local scheduling information which does not pertain to the network to which the IRD is associated, as well as filtering out global scheduling information for programs that do not correspond to the set of channels available to the individual IRD (as defined by its "channel map"). The system should allow the communication of scheduling information for television programming as well as other types of data, such as computer programs and games, and stock or weather data, for example.

The interactive program guide should be economical in terms of both communication bandwidth and cost. The guide should respond to user inquiries on an instantaneous or near instantaneous basis. The guide should be compatible with relatively inexpensive set top boxes, and should adapt to the amount of RAM available in a particular set top box.

The present invention provides a method and apparatus for implementing an interactive guide to events having the above and other advantages.

SUMMARY OF THE INVENTION

In accordance with the present invention, IPG data including global data which describes programming broadcast by satellite, and region-specific data which describes programming offered by local CATV networks, is provided in a satellite data stream for television decoders which receive both satellite and local cable television (CATV) transmissions. The IPG data is filtered in both hardware and firmware in the decoder to remove irrelevant data, thereby minimizing decoder cost.

A method for delivering interactive program guide (IPG) data to a plurality of decoders, wherein the IPG data provides information regarding programming services which are delivered to the decoders via at least first and second communication plants (e.g., communication networks), includes the step of assigning each of the decoders to an "IPG region", for example, using multicast addressing data which is provided to the decoders in a group-addressed transmission. Each IPG region may correspond to a CATV network and/or a geographic region, where the definition of the region is optimized for delivery efficiency and to reduce the amount of redundant data that must be carried. For CATV plants, an IPG region may correspond to one or more plants. Thus, the definition of an IPG region in accordance with the present invention is flexible and is not constrained by a physical plant or geographic area. The assignment of IPG regions can further be modified over time.

For example, in many large metropolitan regions, there are several CATV plants which are independently operated. In this case, it may be most efficient to define an IPG region to include the several CATV plants since it is probable that the CATV plants will carry common local programming that is of interest to most users in the metropolitan area. The IPG region may be defined according to a geographic area which can be as small as a county or as large as a state, or even larger, in part depending upon the way the operator wishes to deal with the various design tradeoffs involved.

In a preferred embodiment, the decoders receive non-region-specific programming services that are delivered via the first communication plant and region-specific programming services that are delivered via the second communication plant. The IPG data is delivered to the decoders via the first communication plant.

At each decoder, the IPG data is filtered (typically in a hardware circuit) according to the IPG region which is assigned to each decoder to enable each decoder to recover the corresponding region-specific IPG data while ignoring region-specific IPG data not corresponding to the decoder's IPG region.

The decoders may receive non-region-specific programming services (e.g., network programming) that are transmitted via the second communication plant.

In a particular embodiment, the first communication plant comprises a satellite network (e.g., direct broadcast satellite, DBS) and the second communication plant comprises a cable television network. However, the second communication plant may comprise a terrestrial broadcast network or other communication network. Typically, one IPG region encompasses a plurality of CATV networks within one geographic area.

A programming service may be considered to be non-region-specific when it is targeted to be received by only a threshold portion of a total population of decoders which is less than 100% of a total decoder population. That is, it may be more efficient to target the programming service to all decoders than to specific decoder classes in the different regions when a large fraction of those regions will be recovering the programming service.

In a particular embodiment, the IPG data is broadcast via the first communication plant in data bundles, including at least one data bundle comprising non-region-specific IPG data, and at least one data bundle comprising region-specific IPG data. At each decoder, the data bundles are filtered according to the assigned IPG region to:

(a) recover at least one bundle of region-specific IPG data corresponding to the decoder's assigned IPG region;

(b) recover at least one bundle of non-region-specific IPG data; and (c) ignore at least one bundle of region-specific IPG data not corresponding to the decoder's assigned IPG region.

At least one bundle of region-specific IPG data is addressed to a plurality of different IPG regions. That is, the same region-specific data can used by a number of decoder classes. This removes redundancy by avoiding the need to transmit duplicate data to different regions, thereby reducing the total amount of IPG data.

Bundle identifiers are delivered with the data bundles to allow the decoder to distinguish one bundle from another among the plurality of data bundles of a specific type and time slot that may arrive. That is, IPG data for a particular time slot may be sent in different data blocks in different bundles. The decoder then assembles the IPG data from the different blocks to provide the final on-screen display.

In a second type of filtering, at each decoder, the IPG data may be filtered according to channel map data to enable each decoder to recover IPG data corresponding to channels accessible to that decoder while ignoring IPG data corresponding to channels not accessible to that decoder. Channel map data provides a correspondence between the programming services and a channel identifier which is displayed to the user, such as a channel number, "source identifier" which identifies the programming service provider and/or station identifier (e.g., ABC, NBC). The channel map data may be in the form of a lookup table which associates carrier frequencies of the programming services with the corresponding identifier. For digital services, the channel map also indicates which programming service within the digital multiplex is to be associated with that channel. For example, an IRD may filter IPG data for a global programming service which is not transmitted or otherwise not available to the IRD, for example, due to operator preference or limited channel capacity in the cable network.

In particular, channel map data may be delivered to the decoders via the first communication plant to allow the decoders to recover the region-specific and non-region-specific programming services. Generally, separate channel maps can be provided for channels which are specific to a particular CATV network in an IPG region, as well as for channels which are common to each CATV network.

The channel map data may be provided to the decoders via an alternative method, such as communication via a telephone line, or during set-up of the decoder, where the user or installer is prompted to enter a channel number and station identifier for each programming service that the decoder may access.

Channel map data is typically multicast addressed to groups of decoders that share a common map. For example, all decoders residing in a particular CATV network will share the same channel map.

The CATV network-specific channel map data can be multicast addressed to specific decoders according to the decoder's CATV network-specific class using a multicast addressing scheme, while the non-CATV-network-specific channel map data is transmitted to all decoders.

The CATV network-specific channel map data may be recovered by the corresponding decoders according to the CATV region assigned to each decoder.

When duplicate programming services or channels are delivered to a decoder via the first and second communication plants, one of the programming services or channels may be designated as a preferred source to allow the recovery and display thereof in lieu of the non-designated programming service. For example, the CATV headend may transmit a data bit which designates the CATV programs as preferred sources in the event of a conflict since local commercials are provided via the CATV network.

Corresponding communication apparatus and decoder are presented.

BRIEF DESCRIPTION OF THE DRAWINGS

FIG. 4 illustrates the transmission and reception of global and regional IPG data in accordance with the present invention.

DETAILED DESCRIPTION OF THE INVENTION

IPG data, including global data which describes programming broadcast by satellite and national CATV networks, and region-specific data which describes programming broadcast only by CATV networks found within an assigned IPG region, is provided in a satellite data stream for television decoders which receive both satellite and cable television (CATV) transmissions.

Figure 1:
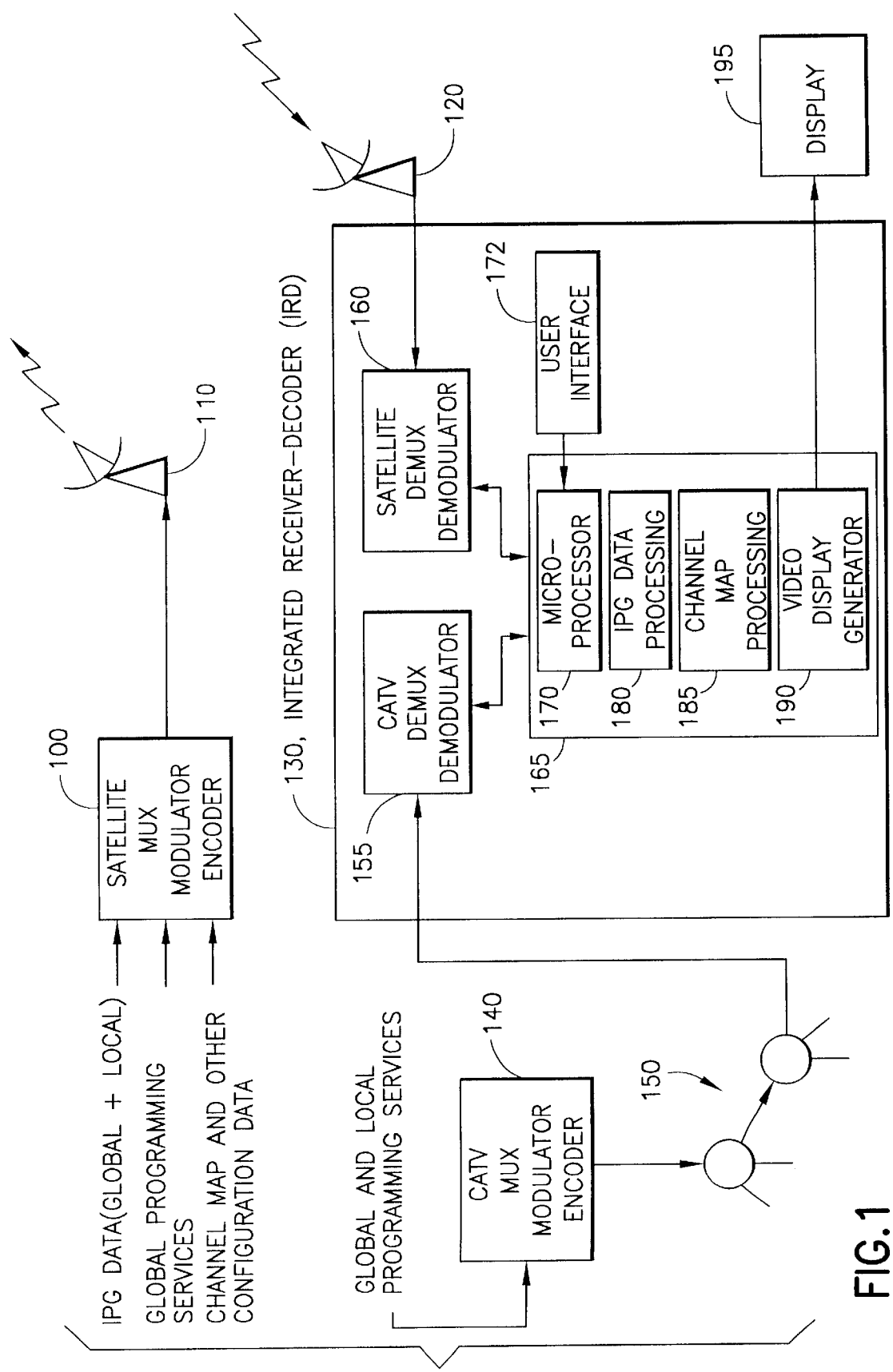
FIG. 1 illustrates the transmission and reception of IPG and programming service data via satellite and CATV paths in accordance with the present invention.

FIG. 1 illustrates the transmission and reception of data via satellite and CATV paths in accordance with the present invention. The illustration provides a high-level functional overview of the present invention. A satellite multiplexer (MUX), modulator and encoder 100 receives IPG data for both global and local programming services (e.g., sources). IPG data from hundreds or even thousands of sources may be included. Ideally, IPG data for every program which is available via satellite and CATV is provided.

The IPG data provides program title, program description, and scheduling information for global (e.g., non-region-specific) programming, such as network programs (e.g., ABC, NBC, CBS, FOX) and other global satellite offerings (e.g., The Disney Channel, Nickelodeon, etc.) as well as scheduling information for region-specific programming, such as local news programs by independent stations or local network affiliates, and local access programs.

The satellite MUX, modulator and encoder 100 also receives all or, typically, a portion of the global programming services themselves (e.g., digital audio and video) as well as channel map data for both the global and local programming services, and other configuration data, discussed in greater detail in connection with FIG. 2. The channel map data correlates the programming services with channel assignments (e.g., channel numbers and frequencies) at a decoder. The channel map data may also be used by an IRD to filter out IPG data which is not used by the IRD. Separate channel maps can be provided for the global and regional programming services.

Channel assignments may be made by grouping channels according to a grouping criteria, such as common source or field of interest, for example, as discussed in commonly-assigned co-pending U.S. patent application Ser. No. 08/769,591 to Eyer et al. filed Dec. 18, 1996, incorporated herein by reference.

A combined signal containing the IPG data, global programming services, and channel map data is provided to a transmitter 110 for communication via satellite to a receiver 120. The received signal is then provided to an IRD 130.

A CATV MUX, modulator and encoder 140 receives global and local programming service signals. The programming services may be received from other satellite links, not shown, or stored on recorded media, for example. Some of the global programming services received by the CATV MUX, modulator and encoder 140 may also be included in the global program services which are transmitted via satellite.

In the case that one IRD can receive the same programming service via either cable or satellite (e.g., there are duplicative programming services), it is necessary to determine which programming service to recover and display. Generally, a CATV operator prefers to have the CATV programming service recovered since CATV technology presently allows the insertion of local commercials.

The global and local programming services are delivered from the CATV MUX, modulator and encoder 140 via a CATV network to the IRD 130. The CATV network may comprise a hub and spoke configuration as shown.

The IRD 130 includes a demodulator and CATV demultiplexer (DEMUX) 155 and a satellite demodulator and DEMUX 160, which can be independent units, or can be integrated into a common IRD unit 130 as shown.

The CATV DEMUX and demodulator 155 recover the global and local programming services which were delivered via the cable network 150, while the satellite DEMUX and demodulator recovers the IPG data, global programming services, and channel map data which was delivered via the satellite link 110, 120.

The recovered data is provided to a processing function 165, which includes a microprocessor 170, an IPG data processing function 180, a channel map processing function 185, and a video display generator 190. The microprocessor 170 is responsive to user request signals from a user interface 172 which may receive remote infrared signals from a hand-held controller, e.g., for changing the channel, adjusting the volume, etc. Switching means may be provided to couple the selected programming service (e.g., audio, video and/or non-IPG data) from either the CATV DEMUX and demodulator 155 or the satellite DEMUX and demodulator 160 for decoding and subsequent display.

The IRD 130 performs filtering to determine which portion of the IPG data, programming services, and channel map data is needed. That is, IPG data for IPG regions other than the specific region to which the IRD 130 is assigned is not needed and can therefore be ignored or discarded, e.g., at the IPG data processing function 180. Likewise, channel map data for CATV systems other than the specific CATV system to which the IRD 130 is assigned is not needed and can be discarded in an analogous filtering process.

Generally, an IPG region can be assigned to include one or more CATV networks in a geographic area. The criteria for assigning an IPG region requires balancing various factors. For example, The number of IPG regions should be set large enough that the amount of filtered data accepted following the first level of filtering in the IRD is at an acceptably low data rate. The number of IPG regions should be set as large as is reasonable to increase efficiency, since certain program sources near region boundaries will need to be included in the data set for both regions.

A large area served by a particular satellite broadcast, e.g., the continental United States, can be divided into a plurality of generally non-overlapping regions which are served by CATV systems or other communication networks (e.g., via telephone lines). Although the network boundaries do not usually overlap (e.g., a user usually only has access to only one CATV network), certain programming sources may be included for two or more CATV networks. For example, two or more CATV networks in a metropolitan area usually carry the same local news programs from network affiliates.

If the same program service is provided via the CATV network 150 and the satellite network 110, 120, the IRD 130 the operator may wish to control which of the two the IRD should recover. The channel map or other data may optionally indicate that channels provided via CATV are preferred sources since local commercials can be inserted into CATV programming. The IRD can be programmed to detect the preferred status of a channel to select the appropriate channel when there is a conflict, e.g., duplicative channels.

For example, a "preferred source" data bit which is delivered to the IRDs can indicate which cable channels are preferred sources with a "1", while non-preferred cable channels are designated with a "0". Thus, if the duplicative channel "CNN" is received via both the satellite network and the CATV network, and the CATV channel is designated as a preferred source, the CATV channel will be displayed when selected by the user in lieu of the satellite channel. The "CNN" service carried on satellite will not be accessible by the user, even though it is available to the IRD's tuner/demodulator.

The "preferred source" data bit can be delivered with the channel map data over the satellite network, for example, via the CATV network, or via some other method, such as local installation via a smart card.

The channel map processing function 185 stores the channel map data received via the satellite network to coordinate a user request for a particular channel from the user interface 172 with the video data which is processed by the video display generator function 190 and subsequently displayed on a display (e.g., television) 195.

The video display generator 190 may include a video decompression processor for processing digital video data. Generally, digital video is delivered via the satellite network, while digital and/or analog video is delivered via the CATV network. Analog programming is currently most prevalent with CATV systems. Analog signal processing circuitry can be provided to process analog video signals in a known manner. Means, not shown, are also required to process the audio data, whether it be digital or analog.

Figure 2:
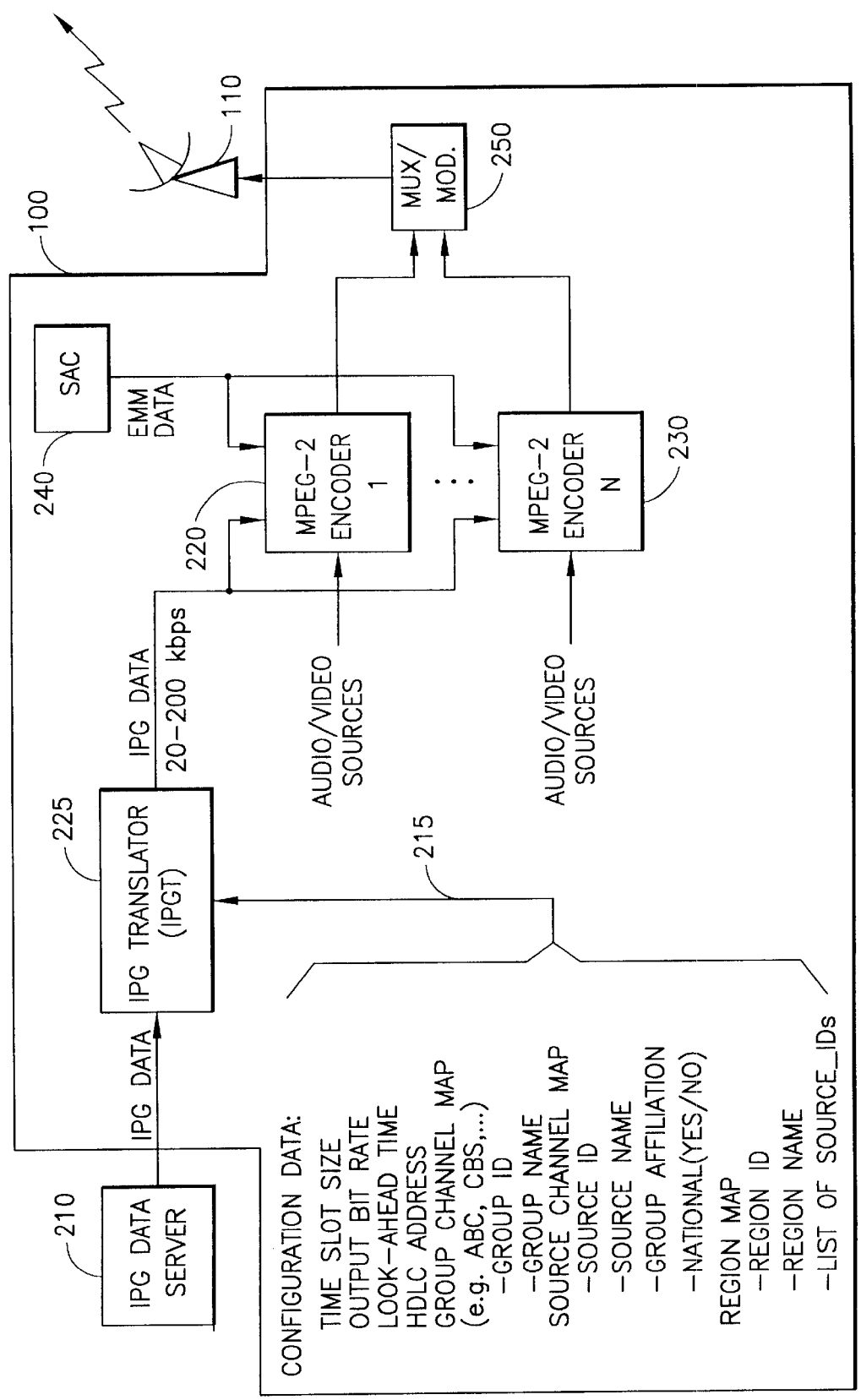
FIG. 2 illustrates an IPG system data flow at a satellite uplink site in accordance with the present invention.

FIG. 2 illustrates an IPG system data flow at a satellite uplink site in accordance with the present invention. Details of the satellite MUX, modulator and encoder 100 are shown. IPG data is stored in an IPG data server 210 and provided to an IPG translator (IPGT) 220. The IPG translator 220 is a headend system which translates source data into IPG messages for downstream transmission to subscriber terminals.

The IPG translator 220 also receives configuration data, which includes associated parameters such as time slot size, output bit rate, look-ahead time, high-level data link controller (HDLC) address, group channel map (including group ID and group name), source channel map (including source ID, source name, group affiliation, and national or global data indicator), and a region map (including region ID, region name, and list of source IDs). A source ID is a number uniquely assigned to each program source in the system, and is used as an identifying reference in the IPG database.

The IPGT provides a continuous flow of IPG data at typically 20–200 kbps to a plurality of encoders, such as MPEG-2 encoders 1, . . . , N (220, . . . , 230). While MPEG-2 encoders are shown, other digital transport standards may be used. The encoders 220, . . . , 230 encode audio and video data from global and local programming services.

The encoders 220, . . . , 230 also receive Entitlement Management Message (EMM) data from a Subscriber Authorization Center (SAC) 240. This data, which is appended to the various programming services, authorizes the decoders to receive particular programming services, for example, according to a tiered marketing scheme.

The encoders 220 and 230 output the programming services, IPG data, and EMM data to a MUX and modulation function 250 to provide a signal which is suitable for transmission by the transmitter 110.

Figure 3:
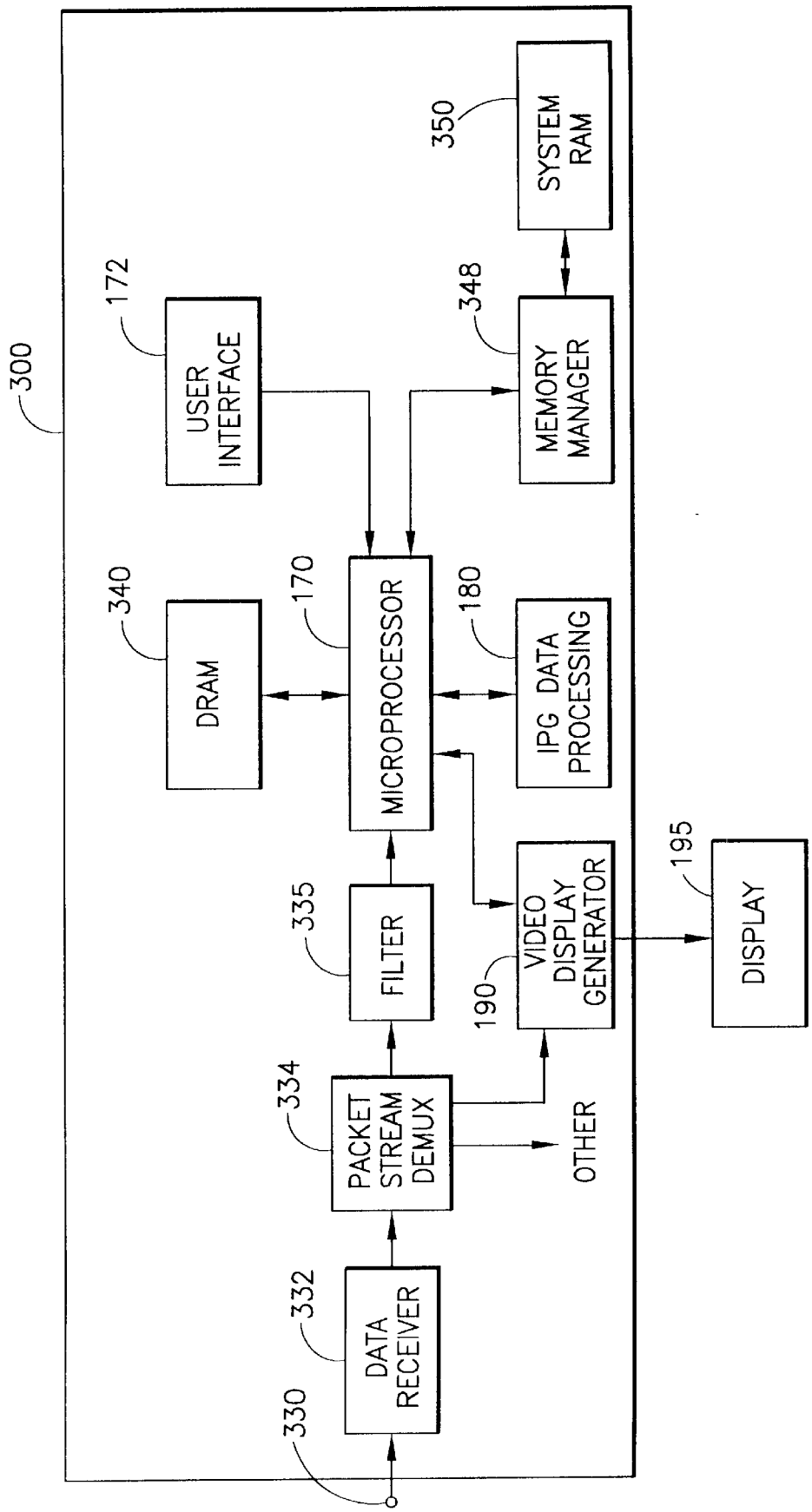
FIG. 3 is a block diagram of an apparatus for receiving and decoding IPG data in accordance with the present invention.

FIG. 3 is a block diagram of an apparatus for receiving and decoding IPG data in accordance with the present invention. The transmitted data is received by a population of IRDs, including an IRD 300, via the satellite and CATV communication networks. The IRD 300 corresponds to the IRD 130 of FIG. 1.

A data receiver 332 receives the transmitted data stream via an input terminal 330. The received data is provided to a packet stream demultiplexer 334, where video packets of the programming services are output to a video display generator 190, and other packets (e.g., audio packets) are output to other processing functions, not shown. The video display generator 190 performs video decompression processing to prepare a signal for the display 195.

The packet stream demultiplexer 334 also outputs packets of the IPG data to an IPG filter 335, which discards region-specific IPG data for regions other than the IPG region to which the IRD 300 is assigned, while passing IPG data for the IPG region to which the IRD is assigned to microprocessor 170. Filtering is implemented in hardware and is based on associated IPG region identifying data which is multicast addressed to the IRD 300. The filter 335 passes all IPG data for the global programming services, as that data is broadcast-addressed, not multicast-addressed.

Thus, the IPG data which is received by the microprocessor 170 provides scheduling information for the global programming services, and for region-specific programming services for the IPG region of the particular IRD. In accordance with the present invention, regional IPG data is multicast addressed to IRDs in different IPG regions to allow each IRD to recover only the IPG data for its region. This reduces the amount of IPG data that must be processed by microprocessor 170, thereby reducing memory and CPU requirements, while still providing the user with IPG information for all programming available to the user's IRD.

Channel map data is also transmitted to the IRD 300. The IRD 300 can use two channel maps for navigation, namely, one satellite channel map, which is common to all IRDs, and one CATV channel map, which is CATV network-specific. Recall that a single IPG region may be defined by one or more CATV networks. CATV channel maps may be recovered by the corresponding IRDs according to the assigned CATV network identifier. The identifier may be addressed to each IRD using a unit identifier which is unique to each IRD. Multicast addressing enables the high-speed delivery of the channel maps. The filter 335 or an analogous function can filter out all CATV network-specific channel maps except the channel map for the CATV network to which the specific IRD 300 is assigned.

For example, there may be several CATV networks (networks A, B, C, . . . ) in a single IPG region, such as a large urban area. Each CATV network will have its own channel map data. Each IRD will be assigned to a specific CATV network and IPG region by unit-addressed CATV network identifiers and IPG region identifiers, respectively. In cases where a CATV network and an IPG region encompass identical populations of IRDs, separate IPG region and CATV network identifiers are not required.

The dynamic RAM (DRAM) 340 of FIG. 3 may be used for buffering IPG data to be filtered, for example, in firmware or software, according to a cable system identifier (ID) which can be set, for example, by a message addressed to each specific IRD. The microprocessor 170 can discard or ignore IPG data for programs which are not defined within the channel map stored in the IRD. The discarded IPG data may correspond to programming services which are not available to the IRD, for example, due to operator preference or limited channel capacity. Objects in the IPG database may be linked to the cable and satellite channel maps by means of Source ID tags. Specifically, the channel map provides a table which correlates three items, namely a user channel number (e.g., channel 10 for ABC), a physical location the received data stream, such as a PID, and a source identifier which is associated with each programming service.

As discussed in greater detail below, the IPG database includes common data, such as sources, schedules, titles and descriptions for satellite channels and network programming, and descriptions for affiliate groups (e.g., local stations which are affiliated with network stations) as well as custom or CATV-network specific data, such as definitions of local cable channels, and schedules, titles and descriptions for the local cable channels.

The IPG data which passes through the filter 335 is processed at the IPG data processing function 180 at the incoming IPG data rate, e.g., typically on the order of 20–200 kbps. Since the IPG data is stored locally in the IRD, it will be instantly accessible for display.

Loading of the IPG data into system RAM 350 is controlled by a memory manager 348 coupled to the microprocessor 170. The memory manager 348 will address the RAM 350 in a conventional manner to store the IPG data for subsequent retrieval by the microprocessor 170 and display on a monitor 195 or the like coupled to the video display generator 190. Selection of particular time slots or scheduling information is made via a user interface 172. For example, a user may request to see scheduling information for a future time period, or detailed information regarding a particular program. The user interface 172 can comprise an infrared remote control receiver coupled to input instructions to microprocessor 170 in a well known manner.

One function of the memory manager 348 is to monitor the amount of free memory available in the system RAM 350. If the amount of memory available is less than that required to store the title And description records for a time slot of interest, the memory manager 348 can purge description records from the system RAM to make room for all of the title records so that the title information will be immediately available to a user once it has been downloaded into the system RAM 350. Preferably, the amount of system RAM 350 allocated for IPG data will be enough to hold at least twenty-four hours of current schedule information.

FIG. 4 illustrates the transmission and reception of global and regional IPG data in accordance with the present invention. IPG data bundles which are broadcast, e.g., over a satellite network to a user's home, include global IPG data in a bundle 0, or B0 (400), described below in greater detail, as well as IPG data for a specific IPG region, e.g., region A, in an associated bundle 1 or B1 (405), IPG data for a region B in an associated bundle B1 (410), and IPG data for a region C in an associated bundle B1 (415). Regions A, B and C are different IPG regions which are served by a common satellite broadcast network.

Each IRD receives the same global and region-specific IPG data bundles. However, in accordance with the present invention, IRD data bundles are filtered out in hardware based on multicast addresses so a specific IRD only needs to store and process IPG data for its region, along with the global IPG data. For example, the received bundles after filtering for an IRD in region A include only B0 (400) and B1 (405), the received bundles after filtering for an IRD in region B include only B0 (400) and B1 (410), and the received bundles after filtering for an IRD in region C include only B0 (400) and B1 (415).

Bundles allow an IRD to distinguish between two different IPG data blocks that are the same type of data (titles/schedules, for example) for the same time slot. Without the bundle numbers, the IRD can not distinguish between two data blocks of the same type and time slot, and would want to discard one as a duplicate.

The use of bundled data blocks allows regional IPG data to be multicast addressed to the IRDs in the corresponding IPG regions while still broadcasting national (e.g., global) IPG data. The scheme involves addressing pages of IPG data by time slot, filtering data slots and pages using firmware and/or hardware filtering, delivering the data in a preformatted manner, and using separate data blocks to deliver title information and program description information. Multicast filtering is suitable here when all the IPG data is in one PID at rates of 20–200 kbps.

Time slots are numbered sequentially in the preferred embodiment, e.g., starting at day zero of the global positioning satellite (GPS) time reference. Virtually any time slot size can be used, however, slot sizes of four, six, eight, twelve or twenty-four hours are preferable to simplify processing.

In a preferred embodiment, all regional IPG data is provided within one PID. Hardware filtering is used in the IRD to filter by IPG region. Second-level filtering in firmware is employed to delete IPG data corresponding to channels not available to the IRD, thus saving RAM. For IRDs with access to cable-delivered programming, the list of available cable channels (e.g., the cable channel map) is used for this firmware filtering. Cable channel maps are delivered via the satellite path, and are addressed by group addressing methods to IRDs associated with particular IRD regions.

The schedule data is in a preformatted form. Although a decoder could be designed to accept and process individual database messages, such as daily schedules, title records, description records, etc., this approach would require substantial bandwidth overhead to deliver message headers and the like. Further, the requirement for such overhead would result in shorter message sizes, thereby creating additional processing overhead in the encoder and decoder. At the same time, the processing time to handle each message could limit the delivery rate, which would increase the acquisition time.

By delivering data to the decoders in preformatted blocks, efficient processing is provided, memory management waste is reduced, access time is reduced, and memory management is simplified. Particularly, by pre-formatting the schedule data at the transmitter side, operations such as sorting the data need only be performed once at the transmitter, and not at each of the millions of decoders that receive the IPG data. In addition to presorting the data, the IPG data can be pre-formatted to provide relatively long messages (e.g., in one kilobyte segments) which are easier to process at the encoder where the streams are created, as well as easier and faster to process and store in the decoder.

The delivery of preformatted IPG data to the decoders also enables entire blocks of IPG data to be purged from the decoder memory once the time slot associated with the data block has passed. Further, if the decoder RAM is running low, description data (as opposed to title data) can be purged, one slot at a time. The resulting RAM is left with large holes, rather than lots of small holes (i.e., fragmentation) that would slow the retrieval of the IPG data from the memory.

The preformatted IPG data blocks are delivered to the decoders for direct storage in RAM. Moreover, the description records are logically separated from daily schedules and title records. In some instances, the decoder will not have enough RAM to hold descriptions for one or more time slots, in some instances so the decoder may choose to store title and schedule records in preference to description records.

An example of a data block format that can be used for the preformatted IPG data blocks is provided in Table 1, while Table 2 provides a data block transmission which is in a MPEG-2 compliant "private section" format, as defined in the MPEG-2 Systems specifications, ITU-T Recommendation H.222.0, "Information Technology—Generic coding of Moving Pictures and Associated Audio Information: Systems (1995-E)," in Section 2.4.4.10.

The C-language-like syntax describes continuous and possible variable length sequences of bits, instead of specifying a procedural program and its functions as in the C computer language. The first column of the syntax contains the syntax element. The second column gives the length of the syntax elements in bits. The third column gives the length of the syntax elements in octets (bytes). The last column describes the information carried in various bits of the syntax element.

The header, e.g., "IPG_data_block( ){ . . . }" in Table 1, indicates that the syntax elements within the braces are a named set and may be invoked elsewhere in the syntax by simply using the designation, for example "IPG_data_block( )". A conditional occurrence of bit structures may be indicated with the usual "if" construct. Customary C-language relational operators may also be used. Loop structures are possible and also use the standard C loop header syntax. The syntax table is accompanied by a set of semantics, providing definitions for each syntax field and may place constraints on its use.

Five types of data blocks are defined, namely, schedule_listings, descriptions, common_listings, common_descriptions, and foundation data. The IPG prelinked record structure format of Tables 1 and 2 represents a preferred embodiment of the present invention.

TABLE 1

|  | Bits | Octets | Bit Number/Description |
|---|---|---|---|
| IPG_data_block(){ |  |  |  |
|   bundle_ID | 4 | 1 | uimsbf range 0–15 |
|   block_type | 4 |  | uimsbf { } |
|   block_version | 8 | 1 | uimsbf range 1–255 |
|   if (block_type==foundation) { |  |  |  |
|     number_of_demand_PIDs | 5 | (3) | uimsbf { } |
|     number_of_trickle_PIDs | 2 |  | uimsbf { } |
|     demand_block_title_lookahead | 5 |  | uimsbf range 1–31 days |
|     common_block_time_slot_size | 4 |  | uimsbf { } |
|     trickle_block_time_slot_size | 4 |  | uimsbf { } |
|     demand_block_time_slot_size | 4 |  | uimsbf { } |
|   } else { |  |  |  |
|   date | 16 | (2) | uimsbf GPS days |
|   time | 8 | (1) | uimsbf hours since 12 am |
|   } |  |  |  |
|   reserved | 8 | 1 | bslbf |
|   database_version | 8 | 1 | uimsbf range 1–255 |
|   block_length | 24 | 3 | uimsbf |
|   for (i==0; i<N; i++) { |  |  |  |
|     is_a_group | 1 | (1) | bslbf {no, yes} |
|     reserved | 7 |  | bslbf |
|     offset_to_next group_or_source | 24 | (3) | uimsbf |
|     if(is_a_group) { |  |  |  |
|       reserved | 8 | ((1)) | bslbf |
|       group_ID | 8 | ((1)) | uimsbf |
|     } else { |  |  |  |
|       source_ID | 16 | ((2)) | uimsbf |
|     } |  |  |  |
|     for (i==0; i<M; i++) { |  |  |  |
|       offset_to_next_record_type | 24 | ((3)) | uimsbf |
|       record_type_ID | 8 | ((1)) | uimsbf |

TABLE 1-continued

|  | Bits | Octets | Bit Number/Description |
|---|---|---|---|
| for (i==0; i<P; i++) { | | | |
|   long_record | 1 | | bslbf {no, yes} |
|   if(long_record) { | | | |
|     record_length | 15 | ((((2)))) | uimsbf (L) |
|   } else { | | | |
|     record_length | 7 | ((((1)))) | uimsbf(L) |
|   } | | | |
|   record_body() | 8*L | (((L))) | |
| } | | | |
| word_alignment | 0–8 | ((0–1)) | bslbf |
| } | | | |
| word_alignment | 0–8 | (0–1) | bslbf |
| } | | | |
| } | | | |

TABLE 2

|  | Bits | Octets | Bit Number/Description |
|---|---|---|---|
| IPG_data_block_transmission(){ | | | |
|   table_ID | 8 | 1 | uimsbf 0x9A |
|   section_syntax_indicator | 1 | 2 | bslbf zero |
|   multicast16_address_included | 1 | | bslbf {no, yes} |
|   always_zero | 2 | | uimsbf zero |
|   private_section_length | 12 | | uimsbf |
|   if (multicast16_address_included) { | | | |
|     multicast16_address | 16 | (2) | uimsbf |
|   } | | | |
|   always_zero | 1 | 1 | bslbf {false} |
|   always_one | 1 | | bslbf {true} |
|   always_zero | 1 | | bslbf {false} |
|   always_zero | 5 | | uimsbf zero |
|   text_type | 5 | 2 | uimsbf{ } |
|   block_version_ref2 | 2 | | uimsbf range 0–3 |
|   bundle_ref2 | 2 | | uimsbf range 0–3 |
|   page_ref7 | 7 | | uimsbf range 0–127 |
|   last_segment_number | 12 | 3 | uimsbf range 0–4095 |
|   segment_number | 12 | | uimsbf range 0–4095 |
|   ISO_639_language | 24 | 3 | uimsbf |
|   page | 16 | 2 | uimsbf |
|   reserved | 3 | 1 | bslbf |
|   text_type | 5 | | uimsbf{ } |
|   IPG_data_block() | 8*N | N | |
|   CRC_32 | 32 | 4 | rpchof |
| } | | | |

The fields from Tables 1 and 2 are described as follows. Related syntax information can be found in commonly-assigned co-pending U.S. patent application Ser. No. 08/502,774, filed Aug. 11, 1995, incorporated herein by reference.

block_type: A 4-bit enumerated type field which identifies the type of IPG data block. The following C code defines the enumeration:

```
enum block_type {foundation, trickle_common_listings,
trickle_common_descriptions, trickle_schedle_listings,
trickle_descriptions, demand_schedule_listings,
demand_descriptions, reserved 1 ... N};
``` block_version: An 8-bit unsigned integer value in the range 0–255 which reflects the version or revision of the data contained in the block. Each time the database is updated (e.g., as a result of program changes, deletions or additions) a new version of the data block covering the affected time slot is generated.

foundation: The block contains untimed data (foundation data) rather than time-related data. The foundation type allows the same data block format to be used for untimed data, such as the compression tables, program theme classes, and channel names.

Trickle_common_listings: The block contains a single copy of each repeated program listing whose first occurrence is in the common_block_time_slot covered by the trickle_common_listings block. A repeated program listing is defined as a listing that is shown more than once, within the trickle database lookahead, either on an affiliated group of channels or on a single channel which does not belong to any group. No such listing are included in any trickle_schedule_listings block (see below). This block type applies to trickle data only.

Trickle_common_descriptions: The block contains a single copy of each repeated program description whose first occurrence is in the common_block_time_slot covered by the trickle_common_descriptions block. A repeated program description is defined as a description that is shown more than once, within the trickle database lookahead, either on an affiliated group of channels or on a single channel which does not belong to any group. No such description are included in any description block (see below). This block type applies to trickle data only.

Trickle_schedule_listings: The block contains daily schedules and program listings specific to each time slot. For trickle data, these listings correspond to single-show programs—those which are shown only once within the lookahead.

Trickle_descriptions: The block contains program descriptions specific to each time slot. For trickle data, these descriptions correspond to single-show programs—those which are shown only once within the lookahead common_block_time_slot_size: A 4-bit enumerated type field which defines the time slot size in hours for common_listings and common_descriptions blocks. The slot size for these common data blocks are selected so that it is an integer multiple of, or equal to, the slot size used by the trickle data blocks. The following C statement defines the enumeration:

```
enum common_block_time_slot_size {reserved 1, reserved 2,
four_hours, six_hours, eight_hours, twelve_hours,
twenty_four_hours, forty_eight_hours,
one_hundred_sixty_eight_hours, reserved 3 ... N};
``` trickle_block_time_slot_size: A 4-bit enumerated type field which defines the time slot size in hours for the trickle_schedule_listings and description blocks. The following C statement defines the enumeration:

```
enum trickle_IPG_time_slot_size {reserved 1, reserved 2,
four_hours, six_hours, twelve_hours,
twenty_four_hours, reserved 1 ... N};
``` demand_block_time_slot_size: A 4-bit enumerated type field which defines the time slot size in hours for the demand schedule_listing and description blocks. The following C statement defines the enumeration:

```
enum trickle_IPG_time_slot_size {reserved 1, reserved 2,
four_hours, six_hours, eight_hours, twelve_hours,
twenty_four_hours, reserved 3 ... N};
``` time: An unsigned integer in the range 0 to 23 which represents the hour in the day which is the starting point for data defined in this block. The time field is ignored for foundation data blocks.

date: An unsigned integer in the range 0 to 0xFFFF, representing the day for which schedule data is carried in the block. Day zero is January 6th, 1980 (GPS day zero). The date field is ignored for foundation data blocks.

bundle_ID: Channels are logically divided into "bundles" to efficiently accommodate different channel configurations at the set-top units. The bundle_ID is an 8-bit unsigned integer in the range 0 to 255 identifying each bundle of source channels and groups. The value 0 defines the "common bundle" which includes channels common to all configurations; while other values of bundle_ID identify configuration specific bundles. Typically, a set-top converter requires bundle 0 and one or more other bundles for its configuration.

block_length: A 24-bit count of the number of bytes to follow in the block.

offset_to_next_group_or_source: A 24-bit number representing the distance in bytes to the next group of source channels or the next source channel, i.e., the length of all data to follow for the specified group_ID or source_ID. This field is ignored for the foundation blocks.

group_ID: The identity of the affiliated channel group to which the messages to follow apply. When is_a_group is set, the listing and description record IDs are shared among all the source channels in the group. This field is ignored for the foundation block.

source_ID: The identity of the channel to which messages to follow apply. The source_ID uniquely defines the channel's identity. This field is ignored for the foundation blocks.

offset_to_next_message_type: A 24-bit number representing the distance in bytes to the next type of messages.

message_type: The IPG message type common to all messages to follow.

long_message: A Boolean flag which indicates, when set, that the message length is a 15-bit field. When clear, the message length field is 7 bits.

message_length: A 7 or 15-bit field defining the length of the message body to follow.

message_body( ): The body of one given IPG message. The header portions are not stored, but their contents are reflected in fields such as the group_message_type and message length.

word_alignment: These fields supply from zero to one byte of padding, used to bring the particular part of the block to a word boundary, for processing and addressing efficiency.

The following are examples of IPG record types that can be provided: attribute name, class name, named class assignment, sortable class assignment, sortable subclass assignment, translation table, decode table, source name, schedule record, program title; program description, program package, pay-per-view program, etc.

An IPG translator (IPGT) configuration parameter, Source_Channel_Map, defines and describes program sources included in the downloaded IPG database. To differentiate between national and local sources, a flag "National" is used with following syntax.

```
Source_1_Channel_1_Map = LISTOF   /* One set of entries per source */
<Source ID>,                      /* <<Integer> <65536 */
<Source Name>,                    /* <X-String>e.g. KPBS, A&E */
<Group Name>,                     /* <X-String>e.g. PBS */
<National>,                       /* <Boolean>*/
<Display Group>,                  /* <Boolean>*/
<Premium>,                        /* <Boolean>*/
<Priority>,                       /* <Boolean>*/
;                                 /* Marks end of list */
```

When "National" is true, the source is considered a national source for IPG purposes. Otherwise, the source is local.

An IPGT configuration parameter "Trickle_Multicast16_Address_Base" defines the address base to be used when constructing the multicast16_address field in MPEG-2 messages, e.g., IPG_data_block_transmission( ), that carry bundled IPG data blocks. The base is defined such that, when added to the corresponding Region ID in the Region_Map, it will result in the 16-bit multicast address value used by the IRD to filter IPG trickle data. The "Trickle_Multicast16_Address_Base" parameter is defined by the following syntax.

Trickle_Multicast16_Address_Base=<Hex Integer>;/*
  e.g., 0x8800*/

An IPG region is a collection, for the purpose of IPG data delivery, of program sources shared by one or more channel line-ups. The IPG data for the sources in a given region will be pre-linked into one data block bundle and delivered to the cable system(s) in the assigned region only.

An IPGT configuration parameter is defined below for this purpose. Note that only regional sources, those tagged with a FALSE National flag in the Source_Channel_Map, will be included in the Region_Map, and that a single regional source may belong to multiple regions. The following syntax may be used.

| | |
|---|---|
| Region_Map = LISTOF | /* One set per IPG region */ |
| <Region ID>, | /* 0 <= <Integer> <= 2047 */ |
| <Region Name>, | /* for tracking purposes */ |
| {<Source ID>, . . . , <Source ID>} | /* 0 <<Integer> <65536 */ |
| ; | /* Marks end of list /* |

Region_ID is specified as an offset relative to the Trickle_Multicast16_Address_Base to be used for the construction of the multicast16_address field in IPG_data_block_transmission( ) (Table 2). The Region_ID is defined such that, when added to the Trickle_Multicast16_Address_Base, it will result in the same multicast16_address value used by the IRD to filter trickle IPG data.

The source_IDs delimited by each pair of brackets "{ . . . }" define the set of sources belonging to the region identified by the immediately preceding Region_ID. All program sources corresponding to the same channel line-up are included in the same IPG region. If several channel line-ups share most of the sources, all sources contained in those channel line-ups should be included in the same region to reduce the total amount of data transmitted.

An IPGT configuration parameter, Trickle_Rate, specifies the data rate to be used in playing out IPG messages.

A Bundle Repetition Frequency is defined by the following syntax.

| | |
|---|---|
| Trickle_Bundle_Repetition_Frequencies = | |
| LISTOF | /* One set per IPG Provider */ |
| <IPG Provider ID>, | /* <Integer> Provider using this IPGT */ |
| LISTOF | /* Up to 15 <Bundle_ID>-<Inv_Freq> pairs per IPG Provider */ |
| <Bundle_ID>, | /* 1 <= <Integer> <= 15 */ |
| <Inverse_Frequency> | /* <= <Integer> */ |
| ; | /* Marks end of list */ |

The parameter Trickle_Bundle_Repetition_Frequencies specifies the frequency at which each bundle (for all block types) other than bundle 0, are transmitted in each transmission cycle. The repetition frequency for bundle 0 is always one bundle per cycle, that is, all blocks of bundle 0 are transmitted once per cycle. Therefore, a transmission cycle is defined as the interval between two consecutive transmission start times for bundle 0. Bundle 0 is defined below in greater detail in connection with data block bundling.

Up to fifteen pairs of <Bundle_ID> and <Inverse_Frequency> can be specified for each IPG provider. Unused entries are null, i.e., a series of commas. The bundle_ID values are as defined in the IPG_data_block ( ) structure, except that the repetition frequency for bundle_ID 0 cannot be specified because, by definition, it is always one bundle per cycle. If no repetition frequency is specified for any bundle to be transmitted, a default frequency of once per cycle is used.

Note that the integer value, <Inverse_Frequency>, specified is the inverse of the repetition frequency. For example, the pair Bundle_ID=1 and Inverse_Frequency=3 specifies a repetition frequency of one-third, i.e., once every three cycles for bundle 1. In other words, with every transmission of all blocks of a 0-valued bundle_ID, only one third of the blocks with bundle_ID equal to 1 are transmitted.

One set of values are assigned to each IPG Provider. The system may support one Provider per IPGT, and only bundle_ID values of 0 and 1. As a result, only one pair of integer values are present to specify the repetition frequency for bundle 1, followed by fourteen pairs of null entries.

Implementation of repetition frequencies, transmission cycles, as well as the ordering of the bundled blocks is discussed in greater detail below. A gap in a program schedule is a time interval for which no program schedule data is available. A configuration parameter, Gap_Description, specifies the descriptive text to be provided in the downloaded database by the IPGT in the event that such a gap is detected in the IPG source data. It also specifies the minimum duration, say, in minutes, of such time periods to qualify as a gap. That is, a gap is detected when a time period of Minimum_Duration or longer is found in the source data during which no schedule data is available.

| | |
|---|---|
| Gap_Description = <X-String>, | /* For detected gaps in schedule */ |
| <Minimum_Duration> | /* 1 <= <Integer>, in minutes */ |
| ; | /* Marks end of list */ |

The prelinked IPG data block format facilitates IPG data block bundling in accordance with the present invention.

Program sources may be logically divided into "bundles" to efficiently accommodate different channel configurations at the IRDs. The parameter bundle_ID is a four-bit unsigned integer in the range zero to fifteen identifying each bundle of source channels and groups. The value 0 defines the "common bundle" which includes national sources; while other values of bundle_ID identify region-specific bundles. Typically, an IRD requires bundle 0 and one or more other bundles for its region. For example, the system may be designed such that each IRD receives bundle 0 carrying all national sources, along with bundle 1 containing the regional sources for its region. The bundle_ID bits are set to zero if the data block is not bundled.

The four contiguous fields, text_type (which is intentionally duplicated), block_version_ref2,bundle_ref2, and page_ref7 in IPG_data_block_transmission ( ) (Table 2) form a Table Extension, which serves to uniquely identify each IPG_data_block_transmission ( ) message.

The parameter "common_block_time_slot_size" is a four-bit enumerated type field which defines the time slot size in hours for trickle_common_listings and trickle_common_descriptions blocks. The slot size for these common data blocks is selected to be an integer multiple of, or equal to, the slot size used by the trickl_schedule_listings and trickle_descriptions blocks. The following C statement defines the enumeration:

enum common_block_time_slot_size {reserved1, reserved2, four_hours, six_hours, eight_hours, twelve_hours, twenty_four_hours, forty_eight_hours, one_hundred_and_sixty_eight_hours, reserved3 . . . N};

The parameter "trickle_block_time_slot_size" is a four-bit enumerated type field which defines the time slot size in hours for the trickle_schedule_listings and trickle_descriptions blocks. The following C statement defines the enumeration:

enum trickle_block_time_slot_size {reserved1, reserved2, four_hours, six_hours, eight_hours, twelve_hours, twenty_four_hours, reserved3 ... N};

In the format of Table 2, two addressing modes, broadcast and 16-bit multicast, are used for IPG trickle data delivery. The broadcasting mode is used to deliver guide data for national sources, while the 16-bit multicast addressing mode is used to deliver data specific to individual regions.

Multicast16_address_included is a flag which, when set, indicates that the message is addressed using a 16-bit multicast mode. When the flag is clear, the message is broadcast addressed. The flag is set to 1 if the message carries regional IPG data and is cleared to 0 if the message carries national IPG data.

Multicast16_address is a sixteen-bit unsigned integer field that defines the 16-bit multicast address of the IPG region for which the data in the message is intended. The field is constructed by adding the Region_ID in Region_Map to the Trickle_Multicast16_Address_Base, both of which are specified via the translator's configuration file.

Referring again to FIGS. 1–3, requirements for the IPG translator (IPGT), uplink control system (UCS), subscriber authorization center (SAC), encoder, and IRD are described below. In one embodiment, guide data for only satellite sources (a subset of the national sources) will be provided, requiring only bundle 0 and to be broadcast addressed to all regions.

In a more comprehensive embodiment, guide data for all program sources (satellite and cable, national and regional) and affiliated source groups in the system is provided, requiring both bundles 0 and 1 for delivery. The national and regional data will be transmitted using broadcast and 16-bit multicast addressing, respectively. The multicast addresses is derived from region IDs.

IRD region assignments should be as follows.

1. All regional sources carried in the same cable channel line-up must be included in the same IPG region.
2. In general, whether or not a source should be defined as a national source should depend on how many CATV systems share or carry the programming on that source. For example, let T be a threshold value quantifying the degree of sharing of each source, which may be either a percentage or an absolute number of cable channel line-ups carrying that source. Then, any source with a degree of sharing higher than or equal to T can be defined as a national source. In this example if T is set too low, too many sources will be sent to every region; while if T is set too high, too many sources will have to be duplicated for each region carrying that source. T should be selected with these factors in mind.
3. The number of IPG regions should be made as large as possible to minimize the amount of regional data for each region. Conversely, the number of regions should be as small as possible to minimize the total amount of transmitted data. A tradeoff is required.
4. No two IPG regions should be composed of the same set of sources, and no region should be a proper superset of any other region.
5. A regional source may be included in more than one IPG region, but no more than one region should include all the regional sources in any given channel line-up.
6. Include only regional sources in individual IPG regions. The IPGT should implement configuration parameters and definitions described herein.

The IPGT should also construct and update bundled data blocks using the IPG_data_block ( ) format defined in Table 1. This requires filtering of the input source data to determine which sources are to be included in which bundle. Note that IPG_data_block( ) can support up to sixteen bundles, although the examples discussed herein require only two bundles, e.g., bundles 0 and 1.

Bundling is performed for each of the five types of data blocks used by the trickle IPG: foundation, trickle_common_listings, trickle_common_descriptions, trickle_schedule_listings, and trickle_descriptions.

The following descriptions are provided regarding bundling.

For a foundation block type, bundle 0 includes all eight database record types, except that the Source_Name_Record( )s must be included for only national sources. Bundle 1 for each given region includes only the Source_Name_Record ( ) type for only the regional sources in that region. For trickle_common_listings block type, bundle 0 includes a single copy of each repeated program listing referenced by a schedule for any national source (tagged with a TRUE National flag in the Source_Channel_Map) or by a group schedule for any affiliated source group (defined in the Group_Channel_Map). Bundle 1 for each given region includes a single copy of each repeated program listing referenced by a program schedule for any regional source in that region.

For trickle_schedule_listings block type, bundle 0 includes schedules for national sources and group schedules for affiliated source groups. Any unique listings referenced by these schedule records can also be included. Bundle 1 for each given region includes schedules for regional sources in that region. Any unique listings referenced by these schedules is also included.

For trickle_common_descriptions block type, bundle 0 includes a single copy of each repeated program description referenced by a schedule for any national source or by a group schedule for any affiliated source group. Bundle 1 for each given region includes a single copy of each repeated program description referenced by a program schedule for any regional source in that region. For trickle_descriptions block type, bundle 0 includes unique descriptions referenced by schedules for national sources or by group schedules for affiliated source groups. Bundle 1 for each given region includes unique descriptions referenced by a schedule for any regional source in that region.

Updates of the data blocks only have to be performed on bundles. For example, if a program is deleted from the schedule of a regional source, only bundle 1 for the corresponding region has to be updated. As another example, before transmission of a common data block defining a past slot can be stopped, any record carried by the block that is referenced in a future slot must be propagated into a block defining a future slot and having the same bundle_ID.

Each IPG_data_block_transmission( ) is used to carry one bundle (0 or 1) of a trickle data block.

For example, consider the delivery of trickle_schedule_listings blocks for each trickle_block_time_slot. One IPG_data_block_transmission( ) is used to carry bundle 0 of the trickle_schedule_listings block containing program schedules and listings for national sources, and one other IPG_data_block_transmission( ) is built for each region to carry bundle 1 of the trickle_schedule_listings block containing the schedules and listings for the regional sources. Thus, if there are R regions defined in the system, there will be R+1 IPG_data_block_transmission ( ) parameters to carry the schedules/listings for each slot.

Assuming two bundles, 0 and 1, are used for data delivery, some of the IRD requirements to support multi-regional IPG are as follows:

1. Acquire national data (bundle 0) via broadcast addressing, and regional data (bundle 1) by filtering on the multicast16_address field in the IPG_data_block_transmission( ) message. The IRD can use the multicast16 address specified in a unit-addressed message (or otherwise programmed) for its IPG region to acquire the regional trickle IPG data.
2. When a new data block bundle arrives, its bundle_ID (in addition to other fields including block_type, block_version, date and time if applicable, and database_version) must be examined to determine if it should be discarded or should replace a bundle already resident in memory. The IRD can store in its memory both bundles 0 and 1 for each data block type (including the foundation type) and for each time slot (with the exception of the foundation type, which applies to all time slots). That is, the scheme used for memory allocation and management should work with bundled blocks.
3. Delete from each bundle the sources not present in the IRD's virtual channel map, for example, by performing firmware filtering of the database records based on source IDs. The filtering must be performed when the guide data is first acquired each time after the IRD is powered on, and afterwards must be performed only when a new or revised bundle of any block type has been received since the last such filtering. However, no data pertaining to a source group is deleted. Theoretically, the-guide data for a source group has to be retained only if any local channel is an affiliate of that group. But, since the number of affiliated source groups is relatively small, currently less than ten, the requirement here is practically both simpler and faster to implement without increasing the required storage space significantly. Such filtering reduces both the required memory size and the amount of time spent on record searching.
4. Guide data is displayed in the IPG grid for only the sources that are present in both a current channel map (satellite or cable) and a foundation block bundle (0 or 1) of the IPG database. For example, if a program source carried in a previous channel map is deleted from the current channel map, no data is displayed in the IPG grid for that source even though the source is still present in the most recent version of a foundation block bundle.

Accordingly, it can be seen that the present invention provides a method and apparatus for delivering IPG data to a plurality of decoders (IRDs) in a plurality of assigned IPG regions. In a particular embodiment, IPG data is delivered via a satellite network. The IPG data provides scheduling information for global and region-specific programming services which are carried via the satellite network.

At the IRD, IPG data is filtered out using hardware filtering so that only the global data and the region-specific data for the IRD's region is retained and processed by the IRD. The scheme thereby provides IPG data for both global and local programming services.

Channel map data is also delivered to the IRDs so that blocks of IRD data can be filtered out using firmware filtering to discard IPG data for program sources that are not present in the channel map.

When duplicate channels are delivered via the satellite and CATV networks, one channel may be designated a preferred source according to data which is delivered via the CATV network.

The system minimizes the amount of IPG data which is delivered via satellite, thereby maximizing the use of the available bandwidth, and minimizing the acquisition time to refresh the IPG data. Furthermore, unnecessary processing in each IRD is minimized by avoiding the handling by the CPU of IPG data which is unusable, thereby reducing IRD cost. The system further allows an IPG application that integrates satellite and local cable or terrestrial broadcast television sources in a seamless manner.

Although the invention has been described in connection with various specific embodiments, those skilled in the art will appreciate that numerous adaptations and modifications may be made thereto without departing from the spirit and scope of the invention as set forth in the claims.

For example, while the invention was discussed in terms of satellite and CATV communication networks, the invention may be adapted for use with other communication networks, such as telephone and computer networks, as well as terrestrial broadcast networks and off-air networks.

In remote areas where cable television services are not available, many users receive both satellite transmissions and terrestrial broadcasts. With terrestrial broadcasts, the assignment of regions is made inexact due to factors affecting reception and transmission, such as terrain and antenna size. Nevertheless, IPG regions can be assigned based on geographic region, e.g., city or town, or zip code (postal zone). Region assignments can be made at the time of installation of the IRD, or later updated, for example, using a smart card which is mailed to each user. Auxiliary data for assigning the region can be transmitted with the terrestrial broadcast to an IRD, for example, in the video blanking interval. Alternatively, a region can be assigned manually by a user based on programs which are received.

With terrestrial broadcasts, IRDs with above-average reception may receive programs which are not in the assigned IPG region, in which case IPG data for the programs in question will not be available, while IRDs with below-average reception may not receive all programs which are in the assigned IPG region, in which case some programs may not be available even though IPG data which describes the programs is available.

What is claimed is:

1. A method for delivering programming services to a decoder via at least first and second communication plants, wherein a programming service which is delivered to the decoder via said first communication plant and a programming service which is delivered to the decoder via said second communication plant are duplicative with one another, comprising the steps of:

designating one of the duplicative programming services as a preferred source to allow the recovery and display thereof by the decoder in lieu of the non-designated programming service; and delivering data to the decoder to designate the preferred source via at least one of said first and second communication plants.

2. An apparatus for delivering programming services to a decoder via at least first and second communication plants, wherein a programming service which is delivered to the decoder via said first communication plant and a programming service which is delivered to the decoder via said second communication plant are duplicative with one another, comprising:

means for designating one of the duplicative programming services as a preferred source to allow the recovery and display thereof by the decoder in lieu of the non-designated programming service; and means for delivering data to the decoder to designate the preferred source via at least one of said first and second communication plants.

3. A decoder which receives programming services via at least first and second communication plants, wherein a programming service which is delivered to the decoder via said first communication plant and a programming service which is delivered to the decoder via said second communication plant are duplicative with one another, comprising:

means for recovering data which designates one of the duplicative programming services as a preferred source to allow the recovery and display thereof by the decoder in lieu of the non-designated programming service, wherein:

the data which designates the preferred source is delivered to the decoder via at least one of said first and second communication plants.

4. A method in accordance with claim 1, wherein:

the step of designating one of the duplicative programming services as a preferred source occurs at a television headend; and the data which designates the preferred source is sent from the headend to the decoder via at least one of said first and second communication plants.

5. An apparatus in accordance with claim 2, wherein:

the means for designating one of the duplicative programming services as a preferred source is located at a television headend; and the means for delivering data to the decoder which designates the preferred source is located at the headend.

6. A decoder in accordance with claim 3, wherein:

the data which designates the preferred source is delivered to the decoder from a television headend via at least one of said first and second communication plants.

* * * * *

UNITED STATES PATENT AND TRADEMARK OFFICE
CERTIFICATE OF CORRECTION

PATENT NO.    : 6,401,242 B1
DATED         : June 4, 2002
INVENTOR(S)   : Eyer et al.

It is certified that error appears in the above-identified patent and that said Letters Patent is hereby corrected as shown below:

<u>Title page,</u>
Item [63], Related U.S. Application Data, add:
-- Provisional application No. 60/063,085, filed on October 24, 1997 --

Signed and Sealed this

Nineteenth Day of November, 2002

*Attest:*

*Attesting Officer*

JAMES E. ROGAN
*Director of the United States Patent and Trademark Office*